United States Patent [19]
Hoover et al.

[11] Patent Number: 5,481,823
[45] Date of Patent: Jan. 9, 1996

[54] WORM COOLER APPARATUS

[76] Inventors: Brian E. Hoover; Cindy E. Hoover, both of 2087 Fort London Rd., Mercersburg, Pa. 17236

[21] Appl. No.: 325,977

[22] Filed: Oct. 21, 1994

[51] Int. Cl.$^6$ .................................................. A01K 97/04
[52] U.S. Cl. ........................... 43/55; 62/529; 224/920
[58] Field of Search ................................. 43/54.1, 55, 56; 224/920; 220/375, 626, 903; 62/530, 529; 150/901

[56] References Cited

U.S. PATENT DOCUMENTS

| | | | |
|---|---|---|---|
| 2,326,414 | 8/1943 | Thompson | 43/55 |
| 2,620,588 | 12/1952 | Critser | 43/55 |
| 2,790,266 | 4/1957 | Williamson | 43/55 |
| 3,423,869 | 1/1969 | Duerst | 43/55 |
| 3,654,903 | 4/1972 | Montgomery | 119/6.7 |
| 3,882,628 | 5/1975 | Stouder | 43/55 |
| 4,282,279 | 8/1981 | Strickland | 150/901 X |
| 4,450,647 | 5/1984 | Schmidt | 43/55 |
| 4,527,350 | 7/1985 | Tockey, Jr. | 43/55 |
| 4,815,416 | 3/1989 | Wolff | 43/55 X |
| 5,212,963 | 5/1993 | McGinnis | 62/530 X |
| 5,335,809 | 8/1994 | Toida et al. | 220/903 X |

*Primary Examiner*—P. Austin Bradley
*Assistant Examiner*—Jeanne M. Elpel

[57] ABSTRACT

A worm cooler apparatus includes a removable and replaceable bottom lid assembly which includes a first connector and which includes an interior chamber adapted for receiving a quantity of coolant material. A tubular container assembly includes a second connector, is adapted for connection with the first connector, and includes a third connector. A removable and replaceable top lid assembly includes a fourth connector which is adapted for connection with the third connector. Preferably, the first connector is a first threaded portion and the second connector is a second threaded portion complementary to the first threaded portion. Also, the third connector is a third threaded portion, and the fourth connector is a fourth threaded portion complementary to the third threaded portion. The quantity of coolant material is in a form of a sealed coolant assembly which contains ethylene-glycol-based coolant. An insulation jacket assembly encompasses an outer portion of the container assembly. A first tether assembly is connected to the bottom lid assembly and is adapted for connection to an article of clothing worn by a person. A second tether assembly is connected between the top lid assembly and the container assembly.

10 Claims, 3 Drawing Sheets

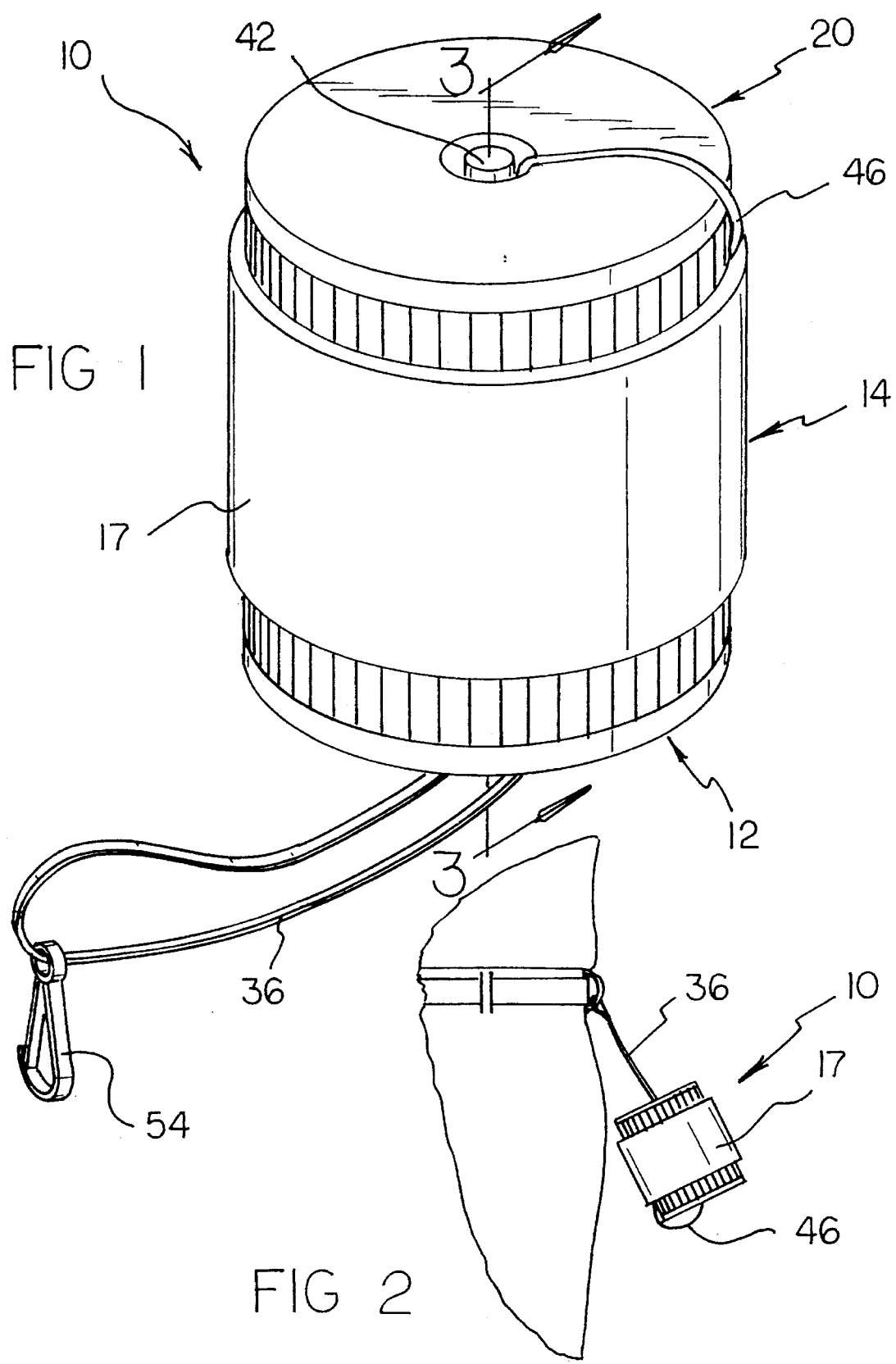

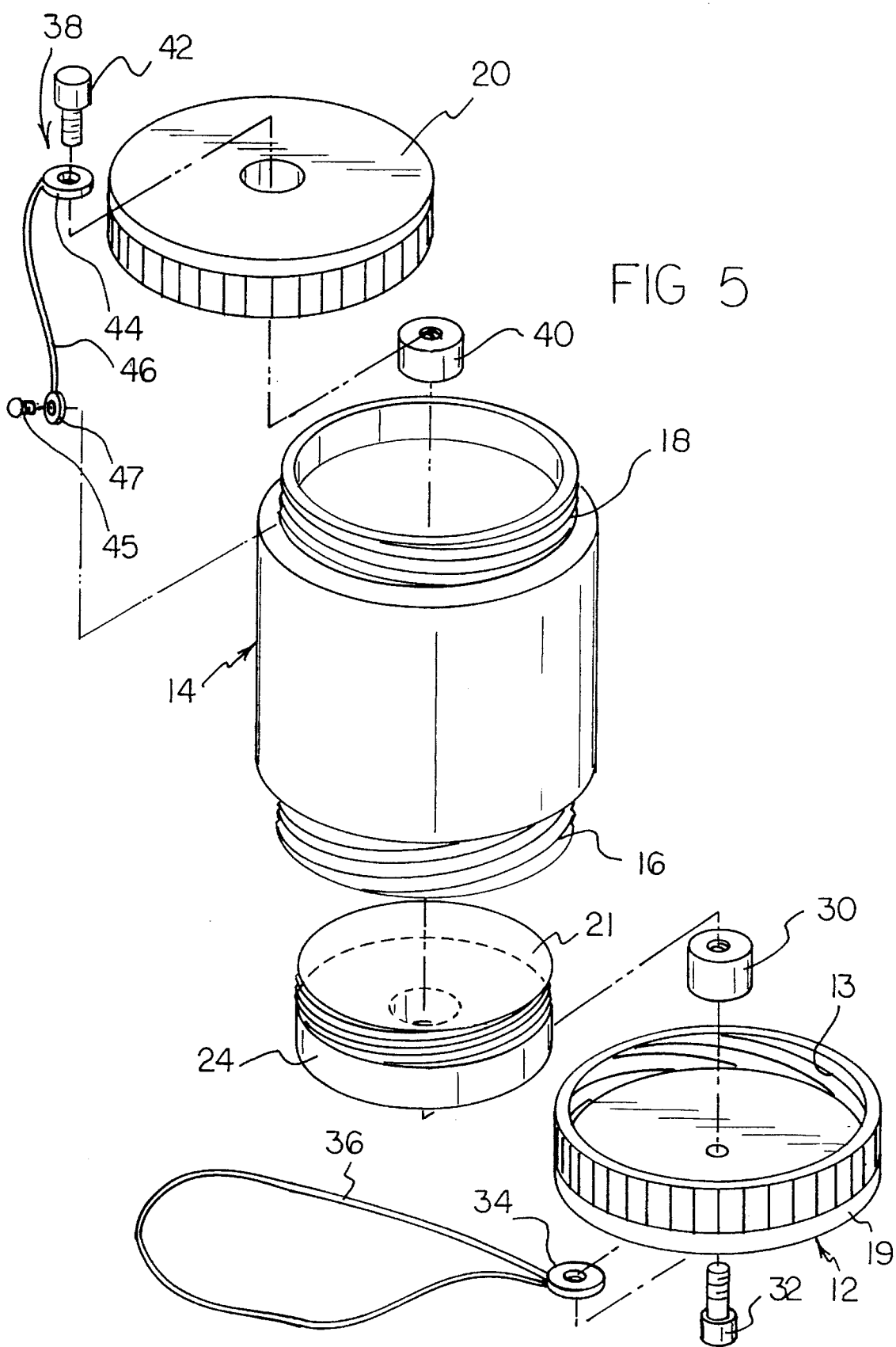

WORM COOLER APPARATUS

BACKGROUND OF THE INVENTION

1. Field of the Invention

The present invention relates generally to portable coolers for keeping bait fresh and, more particularly, to portable coolers especially adapted for keeping worms fresh.

2. Description of the Prior Art

When going fishing one often takes bait along. On hot days, there is a great tendency for the bait to warm up and lose its freshness. In the case of live bait, the warming up can kill the bait. This is especially so in the case of live worms.

Throughout the years, a number of innovations have been developed relating to keeping live bait alive, and the following U.S. Pat. Nos. are representative of some of those innovations: 3,882,628; 4,450,647; 4,527,350; and 4,815,416. More specifically, U.S. Pat. No. 3,882,628 discloses an insulated bait bucket. This bait bucket has a single removable top or cover which allows access to the interior of the container. A disadvantage of this bait bucket relates to the fact that worms, when contained in soil, may move to the bottom of the soil. As a result, in order to retrieve worms from this bucket, one may have to dig through the top portions of the soil to reach the bottom portions where the worms are located. In this respect, it would be desirable if a container were provided for retaining live worms which does not require digging from a top portion of soil to a bottom portion of soil to reach the worms.

U.S. Pat. No. 4,450,647 discloses a bait holder for live leeches. There is only one cap at the top of the container. Moreover, this device uses a triple-wall structure. For purposes of simplicity of manufacture and to minimize costs, it would be desirable if a container were provided for retaining live worms which includes a single-wall structure.

U.S. Pat. No. 4,527,350 discloses a carrier for live worms, and evaporative cooling is used to cool the worms. Evaporative cooling has a number of severe limitations. If relative humidity in the air is high, evaporation, and therefore cooling, is very slow. If too much water is used, liquid leaks can occur. Finally, the actual cooling effect may be too weak or inadequate to provide adequate cooling during a hot day. In this respect, it would be desirable if a container were provided for retaining live worms which provided cooling for the worms without using evaporative cooling.

U.S. Pat. No. 4,815,416 discloses a worm container that includes an interior mesh container. Water condenses from air outside of the mesh, and the condensed water may be used to create a suitable environment for the growth of worms. When water condenses, the heat of condensation should be moved away from the condensed water so that the heat of condensation does not rewarm the water. Because of the heat problem, it would be desirable if a container were provided for retaining live worms which does not depend upon water condensation.

U.S. Pat. No. 3,654,903 may be of interest for its disclosure of a method of growing earthworms.

Still other features would be desirable in a worm cooler apparatus. For example, it would be desirable if a person could carry a worm cooler apparatus in a hands-free manner. It would also be desirable if a lid were tethered to a container so that a lid could not be lost or misplaced once separated from the container. For a dependable cooling source, it would be desirable if sealed, ethylene glycol containing cooling modules can be employed.

Thus, while the foregoing body of prior art indicates it to be well known to use containers for cooling and containing live worms, the prior art described above does not teach or suggest a worm cooler apparatus which has the following combination of desirable features: (1) does not require digging from a top portion of soil to a bottom portion of soil to reach the worms; (2) includes a single-wall structure; (3) provides cooling for the worms without using evaporative cooling; (4) does not depend upon water condensation; (5) enables a person to carry a worm cooler apparatus in a hands-free manner; (6) provides a tether for a lid to a container so that a lid can not be lost or misplaced once separated from the container; and (7) can use sealed, ethylene glycol containing cooling modules. The foregoing desired characteristics are provided by the unique worm cooler apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a worm cooler apparatus which includes a removable and replaceable bottom lid assembly which includes a first connector and which includes an interior chamber adapted for receiving a quantity of coolant material. A tubular container assembly includes a second connector, is adapted for connection with the first connector, and includes a third connector. A removable and replaceable top lid assembly includes a fourth connector which is adapted for connection with the third connector.

Preferably, the first connector is a first threaded portion and the second connector is a second threaded portion complementary to the first threaded portion. Also, the third connector is a third threaded portion, and the fourth connector is a fourth threaded portion complementary to the third threaded portion.

The quantity of coolant material is in a form of a sealed coolant assembly which contains a quantity of coolant. The sealed assembly contains a quantity of ethylene-glycol-based coolant.

The bottom lid assembly includes an exterior lid portion and an interior lid portion which is removably and replaceably connected to the exterior lid portion.

An insulation jacket assembly encompasses an outer portion of the container assembly. The insulation jacket assembly fits onto the container assembly with a friction fit.

A first tether assembly is connected to the bottom lid assembly. The first tether assembly includes a nut and bolt adapted for attachment to the bottom lid assembly. A ring adapted for placement over the bolt for securing the ring to the bottom lid assembly, and a first tether is connected to the ring. The first tether is adapted for connection to an article of clothing worn by a person.

A second tether assembly is connected between the top lid assembly and the container assembly. The second tether assembly includes a nut and bolt adapted for attachment to the top lid assembly. A bolt ring is adapted for placement over the bolt for securing the bolt ring to the top lid assembly. A pin is adapted for attachment to the container assembly. A pin ring is adapted for placement over the pin for securing the pin ring to the container assembly, and a second tether is connected between the bolt ring and the pin ting for connecting the top lid assembly with the container assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved worm cooler apparatus which has all of the advantages of the prior art and none of the disadvantages.

It is another object of the present invention to provide a new and improved worm cooler apparatus which may be easily and efficiently manufactured and marketed.

It is a further object of the present invention to provide a new and improved worm cooler apparatus which is of durable and reliable construction.

An even further object of the present invention is to provide a new and improved worm cooler apparatus which is susceptible of a low cost of manufacture with regard to both materials and labor, and which accordingly is then susceptible of low prices of sale to the consuming public, thereby making such worm cooler apparatus available to the buying public.

Still yet a further object of the present invention is to provide a new and improved worm cooler apparatus which does not require digging from a top portion of soil to a bottom portion of soil to reach the worms.

Still another object of the present invention is to provide a new and improved worm cooler apparatus that includes a single-wall structure.

Yet another object of the present invention is to provide a new and improved worm cooler apparatus which provides cooling for the worms without using evaporative cooling.

Even another object of the present invention is to provide a new and improved worm cooler apparatus that does not depend upon water condensation.

Still a further object of the present invention is to provide a new and improved worm cooler apparatus which enables a person to carry a worm cooler apparatus in a hands-free manner.

Yet another object of the present invention is to provide a new and improved worm cooler apparatus that provides a tether for a lid to a container so that a lid can not be lost or misplaced once separated from the container.

Still another object of the present invention is to provide a new and improved worm cooler apparatus which can use sealed, ethylene glycol containing cooling modules.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the worm cooler apparatus of the invention.

FIG. 2 is a perspective view of the embodiment of the worm cooler apparatus shown in FIG. 1 tethered to a wearer for hands-free carrying.

FIG. 5 is an exploded view of the embodiment of the invention shown in FIG. 1.

DESCRIPTION OF THE PREFERRED EMBODIMENT

With reference to the drawings, a new and improved worm cooler apparatus embodying the principles and concepts of the present invention will be described.

Figure 3:
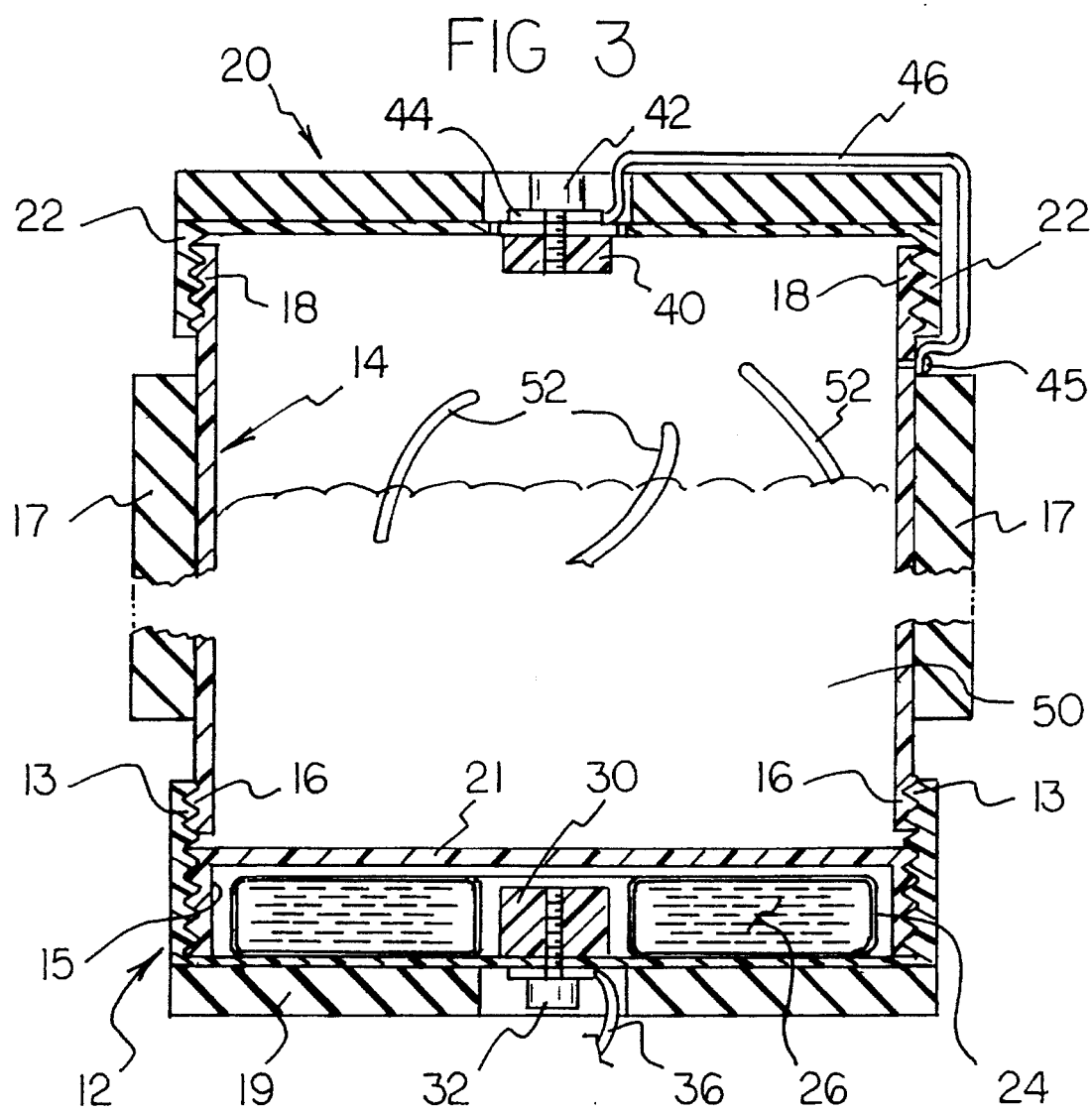
FIG. 3 is a cross-sectional view of the embodiment of the worm cooler apparatus of FIG. 1 taken along line 3—3 thereof.
Figure 4:
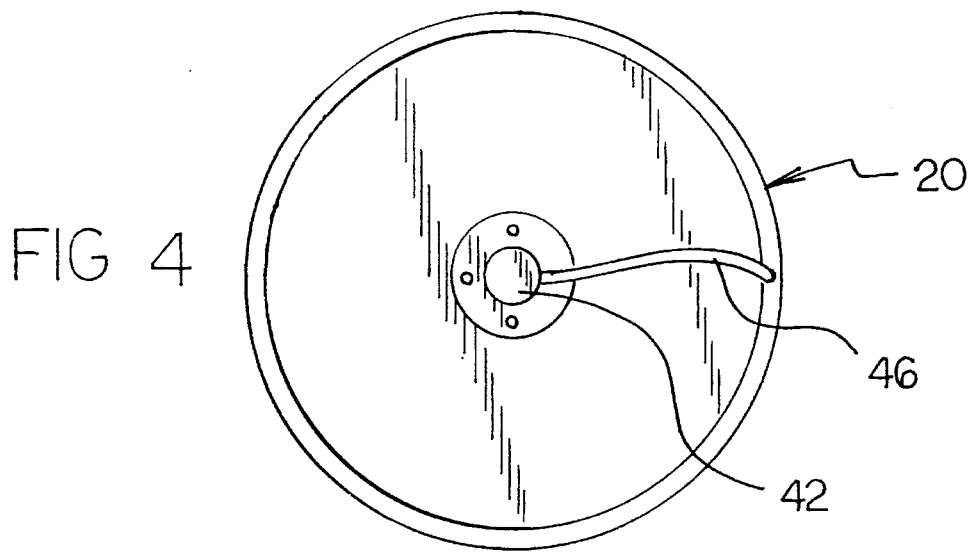
FIG. 4 is a top view of the embodiment of the invention shown in FIG. 1.

Turning to FIGS. 1–5, there is shown an exemplary embodiment of the worm cooler apparatus of the invention generally designated by reference numeral 10. In its preferred form, worm cooler apparatus 10 includes a removable and replaceable bottom lid assembly 12 which includes a first connector 13 and which includes an interior chamber 15 adapted for receiving a quantity of coolant material. A tubular container assembly 14 includes a second connector 16, is adapted for connection with the first connector 13, and includes a third connector 18. A removable and replaceable top lid assembly 20 includes a fourth connector 22 which is adapted for connection with the third connector 18.

Preferably, the first connector 13 is a first threaded portion and the second connector 16 is a second threaded portion complementary to the first threaded portion. Also, the third connector 18 is a third threaded portion, and the fourth connector 22 is a fourth threaded portion complementary to the third threaded portion.

The quantity of coolant material is in a form of a sealed coolant assembly 24 which contains a quantity of coolant 26. The sealed assembly contains a quantity of ethylene-glycol-based coolant.

The bottom lid assembly 12 includes an exterior lid portion 19 and an interior lid portion 21 which is removably and replaceably connected to the exterior lid portion 19. The interior lid portion 21 includes exterior threads which are complementary to and engage with first connector threads 13 which are present on the exterior lid portion 19. The interior chamber 15 of the bottom lid assembly 12 is defined by the interior space between the exterior lid portion 19 and the interior lid portion 21 when the two are connected together.

An insulation jacket assembly 17 encompasses an outer portion of the container assembly 14. The insulation jacket assembly 17 fits onto the container assembly 14 With a friction fit. The insulation jacket assembly 17 is comprised of an insulation foam material.

A first tether assembly is connected to the bottom lid assembly 12. The first tether assembly includes a nut 30 and bolt 32 adapted for attachment to the bottom lid assembly 12. A ring 34 adapted for placement over the bolt 32 for securing the ring 34 to the bottom lid assembly 12, and a first tether 36 is connected to the ring 34. The first tether 36 is adapted for connection to an article of clothing worn by a person.

A second tether assembly 38 is connected between the top lid assembly 20 and the container assembly 14. The second tether assembly 38 serves to prevent the top lid assembly 20 from being completely separated from the container assembly 14 and becoming lost. The second tether assembly 38 includes a nut 40 and bolt 42 adapted for attachment to the top lid assembly 20. A bolt ring 44 is adapted for placement over the bolt 42 for securing the bolt ring 44 to the top lid assembly 20. A pin 45 is adapted for attachment to the container assembly 14. A pin ring 47 is adapted for placement over the pin 45 for securing the pin ring 47 to the container assembly 14, and a second tether 46 is connected between the bolt ring 44 and the pin ring 47 for connecting the top lid assembly 20 with the container assembly 14.

In using the worm cooler apparatus 10 of the invention, a sealed coolant assembly 24 that includes ethylene-glycol-based coolant material is placed in a refrigerator or freezer to cool it down. The sealed coolant assembly 24 is then placed into the interior chamber 15 of the bottom lid assembly 12 resting on the exterior lid portion 19. Then the interior lid portion 21 is screwed into the exterior lid portion 19. The container assembly 14 is screwed into the bottom lid assembly 12. A quantity of soil 50 is placed in the container assembly 14. Then, a quantity of live worms 52 is placed in the soil 50. The top lid assembly 20 is then screwed onto the container assembly 14. As shown in FIG. 2, the first tether 36 can be attached to an item worn by a person, such a belt strap or belt, so that the worm cooler apparatus 10 can be carried in a hands-free manner. A spring clip 54 can be attached to the first tether 36 if desired and used for attaching the first tether 36 to a garment.

When it is desired to extract a live worm 52 from the soil 50, two alternative ways are possible. By one alternative way, the worm cooler apparatus 10 can be held in an upright orientation. Then the top lid assembly 20 can be unscrewed from the container assembly 14. Once separated from the container assembly 14, the top lid assembly 20 can hang by the pivot assembly 46 to prevent its becoming lost.

By a second alternative way, the worm cooler apparatus 10 is held in an upside down orientation. Then, the bottom lid assembly 12 is unscrewed from the container assembly 14. This alternative way may be preferred if the worms 52 tend to move or migrate to the cooled bottom lid assembly 12. If so, the worms 52 will be at the top of the soil 50 in the upside down orientation. Then, the worms 52 can be easily seen and picked out of the soil 50 without moving much soil 50 out of the way.

Other forms of live bait, besides worms, can also be used with the worm cooler apparatus of the invention.

The components of the worm cooler apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved worm cooler apparatus that is low in cost, relatively simple in design and operation, and which may advantageously be used to cool and contain live worms without requiring digging from a top portion of soil to a bottom portion of soil to reach the worms. With the invention, a worm cooler apparatus is provided which includes a single-wall structure. With the invention, a worm cooler apparatus provides cooling for the worms without using evaporative cooling. With the invention, a worm cooler apparatus is provided which does not depend upon water condensation. With the invention, a worm cooler apparatus is provided which enables a person to carry a worm cooler apparatus in a hands-free manner. With the invention, a worm cooler apparatus provides a tether for a lid to a container so that a lid can not be lost or misplaced once separated from the container. With the invention, a worm cooler apparatus is provided which can use sealed, ethylene glycol containing cooling modules.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A live bait cooler apparatus, comprising:

a removable and replaceable bottom lid assembly which includes a first connector and which includes an interior chamber, a sealed coolant assembly containing a quantity of coolant material, wherein said sealed coolant assembly is retained in said interior chamber, a tubular container assembly which includes a second connector adapted for connection with said first connector and which includes a third connector, and a removable and replaceable top lid assembly which includes a fourth connector which is adapted for connection with said third connector.

2. The apparatus of claim 1 wherein said first connector is a first threaded portion and said second connector is a second threaded portion complementary to said first threaded portion.

3. The apparatus of claim 1 wherein said third connector is a third threaded portion and said fourth connector is a fourth threaded portion complementary to said third threaded portion.

4. The apparatus of claim 1 wherein said sealed coolant assembly contains a quantity of ethylene-glycol-based coolant.

5. The apparatus of claim 1 wherein said bottom lid assembly includes an exterior lid portion and an interior lid portion removably and replaceably connected to said exterior lid portion.

6. The apparatus of claim 1, further including:
an insulation jacket assembly encompassing an outer portion of said container assembly, wherein said insulation jacket assembly fits onto said container assembly with a friction fit.

7. The apparatus of claim 1, further including:
a first tether assembly connected to said bottom lid assembly.

8. The apparatus of claim 7 wherein said first tether assembly includes:
a nut and bolt adapted for attachment to said bottom lid assembly,
a ring adapted for placement over said bolt for securing said ring to said bottom lid assembly, and
a first tether connected to said ring, said first tether adapted for connection to an article of clothing worn by a person.

9. The apparatus of claim 7, further including:
a second tether assembly connected between said top lid assembly and said container assembly.

10. A live bait cooler apparatus, comprising:
a removable and replaceable bottom lid assembly which includes a first connector and which includes an interior chamber adapted for receiving a quantity of coolant material,
a tubular container assembly which includes a second connector adapted for connection with said first connector and which includes a third connector,
a removable and replaceable top lid assembly which includes a fourth connector which is adapted for connection with said third connector,
a first tether assembly connected to said bottom lid assembly, and
a second tether assembly connected between said top lid assembly and said container assembly,
wherein said second tether assembly includes a nut and bolt adapted for attachment to said top lid assembly, a bolt ring adapted for placement over said bolt for securing said bolt ring to said top lid assembly, a pin adapted for attachment to said container assembly, a pin ring adapted for placement over said pin for securing said pin ring to said container assembly, and a second tether connected between said bolt ring and said pin ring for connecting said top lid assembly with said container assembly.

* * * * *